(12) United States Patent
Yeo (10) Patent No.: US 8,043,742 B2
(45) Date of Patent: Oct. 25, 2011

(54) SECONDARY BATTERY

(75) Inventor: Kwangsoo Yeo, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 12/453,648

(22) Filed: May 18, 2009

(65) Prior Publication Data

US 2009/0305128 A1    Dec. 10, 2009

(30) Foreign Application Priority Data

Jun. 9, 2008 (KR) ........................ 10-2008-0053803

(51) Int. Cl.
*H01M 2/00* (2006.01)
(52) U.S. Cl. ...................................... 429/163
(58) Field of Classification Search .................. None
See application file for complete search history.

(56) References Cited

U.S. PATENT DOCUMENTS

| | | | | |
|---|---|---|---|---|
| 4,505,993 A * | 3/1985 | Skinner | ......................... | 429/100 |
| 4,732,826 A * | 3/1988 | Hardigg | ......................... | 429/176 |
| 5,958,088 A | 9/1999 | Vu et al. | | |
| 6,045,949 A * | 4/2000 | Kuipers et al. | ................. | 429/233 |
| 6,352,793 B2 * | 3/2002 | Kitoh et al. | ................. | 429/120 |
| 6,451,474 B1 * | 9/2002 | Kozu et al. | ..................... | 429/100 |
| 6,805,992 B1 * | 10/2004 | Hanafusa et al. | ............... | 429/56 |
| 2002/0081490 A1 | 6/2002 | Ferraro et al. | ................. | 429/164 |
| 2004/0043288 A1 | 3/2004 | Nishijima et al. | | |
| 2004/0185337 A1 * | 9/2004 | Ishizaki | ......................... | 429/164 |
| 2004/0211053 A1 | 10/2004 | Trainer et al. | | |
| 2005/0003268 A1 * | 1/2005 | Scott et al. | ..................... | 429/176 |
| 2005/0029985 A1 * | 2/2005 | Hano et al. | ..................... | 320/112 |
| 2005/0181272 A1 * | 8/2005 | Kim | ............................... | 429/56 |
| 2006/0105237 A1 | 5/2006 | Oh | | |
| 2007/0059586 A1 * | 3/2007 | Matsumoto et al. | ............ | 429/53 |
| 2007/0145098 A1 | 6/2007 | Lee et al. | | |

FOREIGN PATENT DOCUMENTS

| | | |
|---|---|---|
| CN | 1476643 A | 2/2004 |
| CN | 1753237 A | 3/2006 |
| CN | 1848481 A | 10/2006 |
| CN | 1886850 A | 12/2006 |
| GB | 2003653 * | 9/1978 |
| JP | 01-095463 A | 4/1989 |
| JP | 2007-066762 A | 3/2007 |
| KR | 10-2001-0041600 A | 5/2001 |
| KR | 2005015006 * | 2/2005 |
| KR | 10 2006-0102753 A | 9/2006 |
| KR | 10-0624952 B1 | 9/2006 |
| KR | 10 2007-0056430 A | 6/2007 |
| KR | 10 2007-0108749 A | 11/2007 |
| WO | WO 2005/057694 A2 | 6/2005 |
| WO | WO 2006/104442 A1 | 10/2006 |

OTHER PUBLICATIONS

Chinese Office Action in CN 200910146645.5, dated Mar. 24, 2011 (Yeo).

* cited by examiner

*Primary Examiner* — Melvin Mayes
*Assistant Examiner* — Sheng H Davis
(74) *Attorney, Agent, or Firm* — Lee & Morse, P.C.

(57) ABSTRACT

A secondary battery including an electrode assembly; a can having an upper opening to receive the electrode assembly and having two facing wide walls, wherein the wide walls are asymmetrical to each other; and a cap assembly sealing the upper opening of the can.

8 Claims, 5 Drawing Sheets

SECONDARY BATTERY

BACKGROUND

1. Technical Field

Embodiments relate to a secondary battery. More particularly, embodiments relate to a secondary battery that can improve safety by controlling a short between electrode plates by using a can whose front and rear surfaces are asymmetrical to each other about a direction of a long edge and which may constantly reproduce a deformation shape when the battery is vertically compressed.

2. Description of the Related Art

A secondary battery may be manufactured by first forming an electrode assembly by winding cathode and anode plates and a separator interposed therebetween in a jelly-roll shape. Then, the electrode assembly may be disposed in a can with electrolyte. Finally, an upper opening of the can may be sealed with a cap assembly.

The can may have a roughly rectangular shape for a rectangular type secondary battery, and may be a metal container made of lightweight conductive metal, e.g., aluminum (Al) or aluminum alloy. Therefore, the can may function as a terminal in itself. The can may be formed by, e.g., deep drawing. All surfaces of the can may be formed to have the same thickness.

In a conventional secondary battery, the can may be deformed when physical impact is applied to both sides of the can about a vertical axis of the battery in a standard test, e.g., vertical compression, and accordingly the electrode assembly contained in the can may also be deformed. However, as described above, all surfaces of the can may have the same thickness; and thus it may be impossible to predict the deformation shape caused by an impact. In other words, it may be very difficult to obtain reproducibility of deformation because the can may be non-directionally deformed by, e.g., a vertical compression test or external impact. In addition, the electrode assembly in the can may also be exposed to irregular pressures. Accordingly, there is a problem that a short between electrode plates may occur at various positions to cause, e.g., fire, rupture, and/or explosion.

SUMMARY

Embodiments are therefore directed to a secondary battery, which substantially overcomes the problems due to the limitations and disadvantages of the related art.

It is therefore a feature of an embodiment to provide a secondary battery that may improve safety by controlling a short between electrode plates by using a can whose front and rear surfaces are asymmetrical to each other about a direction of a long edge and thus can constantly reproduce deformation shape when the battery is vertically compressed.

At least one of the above and other features and advantages may be realized by providing a secondary battery including an electrode assembly, a can having an upper opening to receive the electrode assembly and two facing wide walls, the wide walls being asymmetrical to each other, and a cap assembly sealing the upper opening of the can.

The wide walls may include a first wide wall and a second wide wall and the second wide wall may be thinner than the first wide wall.

The first wide wall and the second wide wall may each have a thickness different from each other and the thicknesses of the first wide wall and the second wide wall may each be about 0.18 mm to about 0.4 mm.

A thickness difference between the first wide wall and the second wide wall may be about 0.05 mm to about 0.10 mm.

The second wide wall may have an upper part, the upper part may have a middle part and a peripheral part, the middle part may include a weak welding part, the weak welding part and the peripheral part may each have a weld and the weak welding part may have a weaker weld than the weld of the peripheral part.

The can may include a narrow wall connected to the first wide wall and the second wide wall and the narrow wall may have a rounded shape.

The narrow wall may have a thickness and the thickness may gradually decrease from the first wide wall toward the second wide wall.

The narrow wall may include a first and a second narrow wall and the first and second narrow walls may be symmetrical to each other.

The first wide wall may include an upper part, and the upper part may include a stepped part in the upper part.

The second wide wall may have an upper part, the upper part may have a middle part and a peripheral part, the middle part may include a weak welding part, the weak welding part and the peripheral part may each have a weld and the weak welding part may have a weaker weld than the weld of the peripheral part.

The wide walls may include first and second wide walls, each with a peripheral part, and wherein the first and second wide walls have the same thickness, one of the first wide wall and second wide wall including a patterned part thinner than the peripheral part thereof.

The patterned part and the wide wall may each have a horizontal width and the horizontal width of the patterned part is about 10% or less of the horizontal width of the wide wall.

The wide wall may include a middle part, the patterned part may include a linear groove in the middle part of the wide wall and the linear groove may extend in a direction substantially parallel to a vertical axis.

The thickness of the wide walls may be about 0.18 mm to about 0.4 mm.

At least one of the wide walls may include an upper part, the upper part includes a middle part and the patterned part includes a groove at the middle part of the upper part of the one wide wall.

The groove may have a shape, and the shape includes at least one of a circle, a triangle and rectangle.

At least one of the above and other features and advantages may also be realized by providing a secondary battery including an electrode assembly, a pouch outer case having a groove to receive the electrode assembly and flat front and rear surfaces, and flat reinforcing plates having sizes corresponding the front and rear surfaces, wherein the flat reinforcing plates are asymmetrical to each other.

The reinforcing plates may include first and second reinforcing plates each having a thickness and the thicknesses of the first and second reinforcing plates are different from each other.

The reinforcing plates may include metal or plastic.

BRIEF DESCRIPTION OF THE DRAWINGS

The above and other features and advantages will become more apparent to those of ordinary skill in the art by describing in detail exemplary embodiments thereof with reference to the attached drawings, in which:

FIG. 2B illustrates a sectional view taken along 'I-I' line of FIG. 2a;

DETAILED DESCRIPTION

Korean Patent Application No. 10-2008-0053803, filed on Jun. 9, 2008, in the Korean Intellectual Property Office, and entitled: "Lithium Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

As used herein, the expressions "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" includes the following meanings: A alone; B alone; C alone; both A and B together; both A and C together; both B and C together; and all three of A, B, and C together. Further, these expressions are open-ended, unless expressly designated to the contrary by their combination with the term "consisting of." For example, the expression "at least one of A, B, and C" may also include an nth member, where n is greater than 3, whereas the expression "at least one selected from the group consisting of A, B, and C" does not.

As used herein, the expression "or" is not an "exclusive or" unless it is used in conjunction with the term "either." For example, the expression "A, B, or C" includes A alone; B alone; C alone; both A and B together; both A and C together; both B and C together; and all three of A, B, and C together, whereas the expression "either A, B, or C" means one of A alone, B alone, and C alone, and does not mean any of both A and B together; both A and C together; both B and C together; and all three of A, B, and C together.

As used herein, the terms "a" and "an" are open terms that may be used in conjunction with singular items or with plural items. For example, the term "a metal" may represent a single compound, e.g., aluminum, or multiple compounds in combination, e.g., aluminum mixed with iron.

Figure 1:
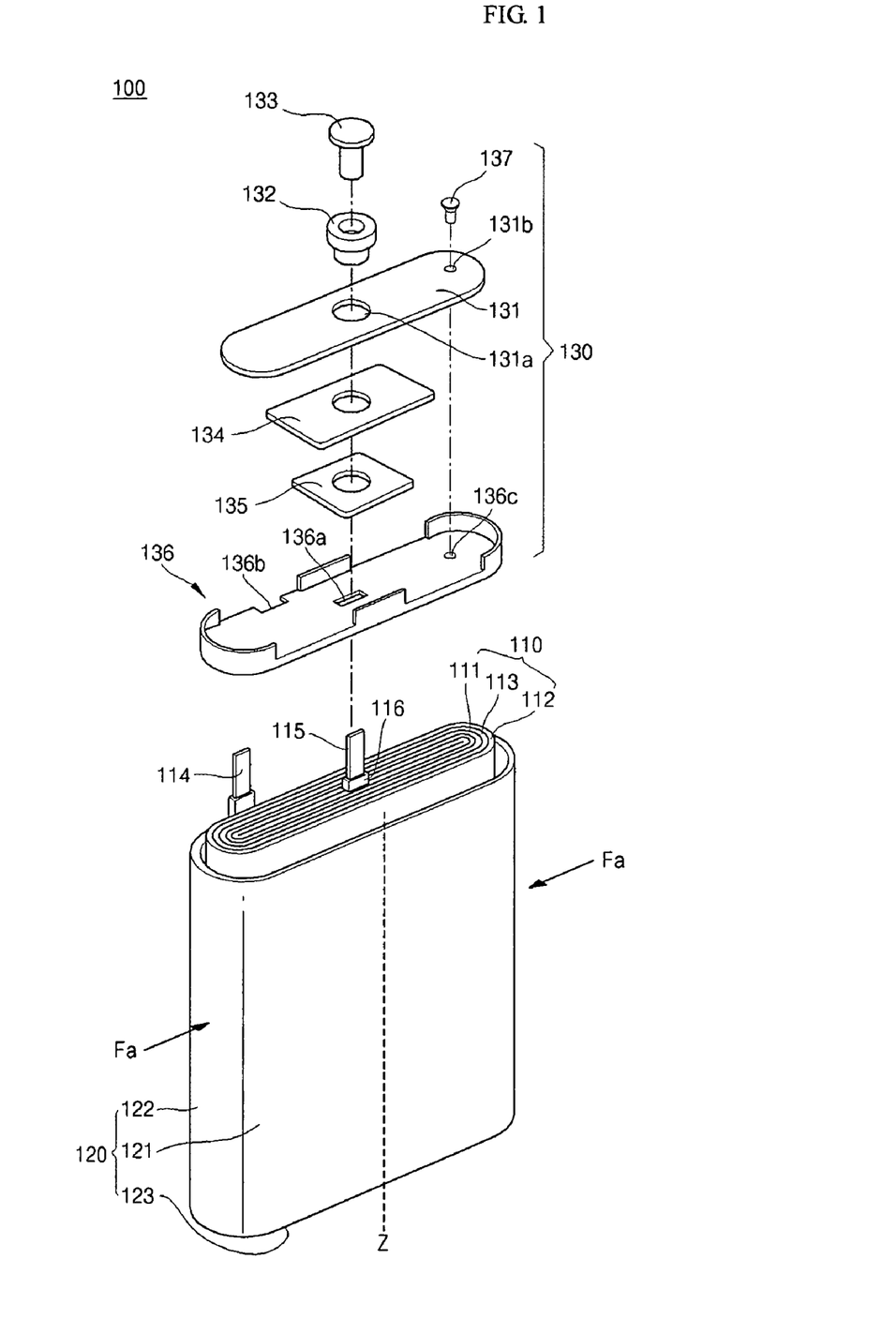
FIG. 1 illustrates an exploded perspective view of a secondary battery according an embodiment.
Figure 2A:
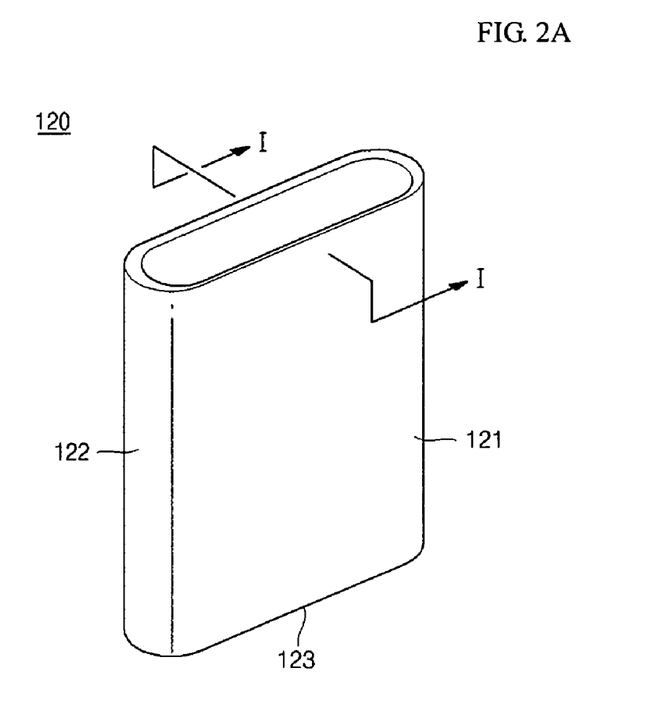
FIG. 2A illustrates a perspective view of a can according to an embodiment.
Figure 2B:
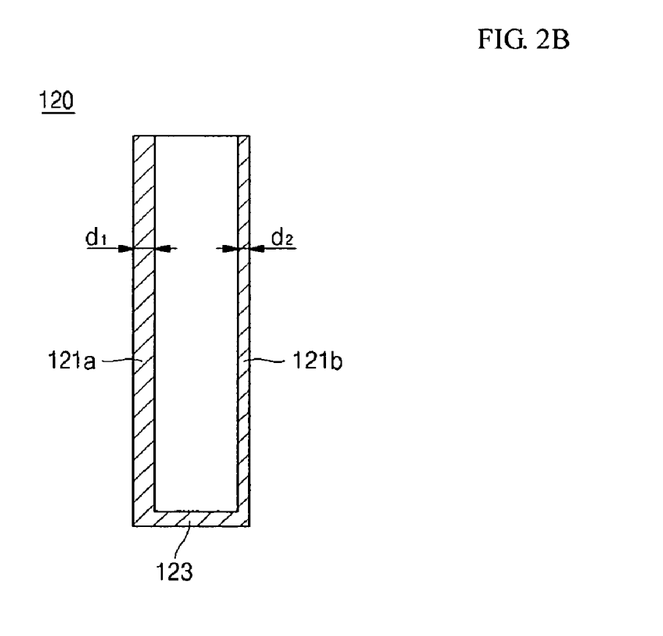
Figure 2C:
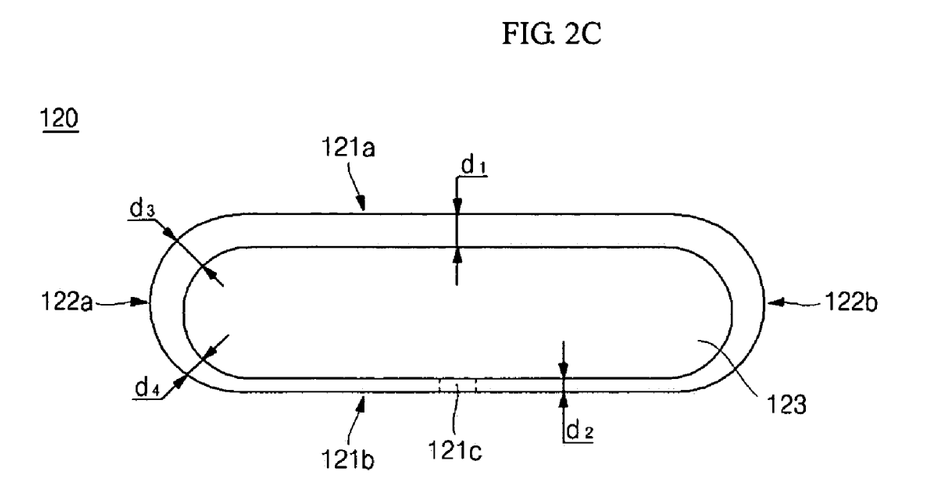
FIG. 2C illustrates a plan view of the can according to an embodiment.
Figure 2D:
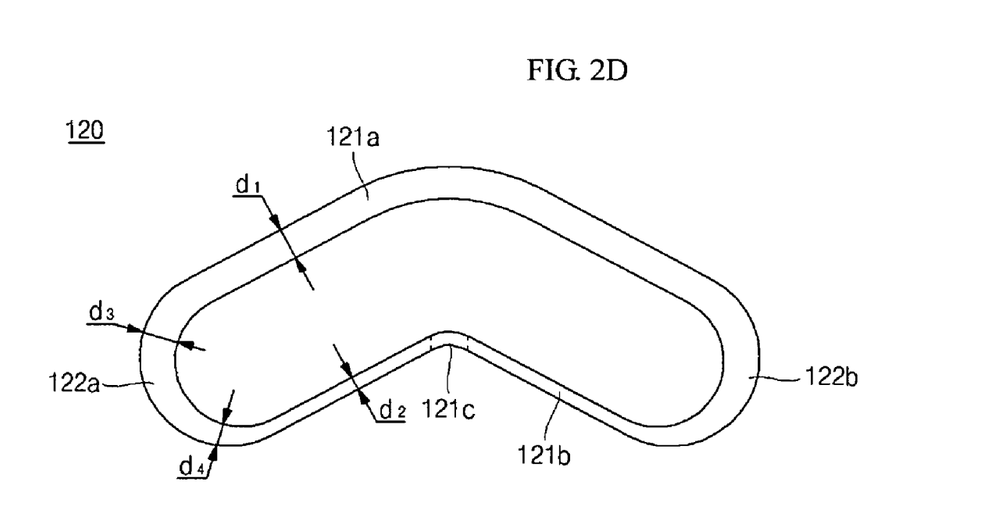
FIG. 2D illustrates a plan view of the shape of the can deformed by vertical compression.

FIG. 1 illustrates an exploded perspective view of a secondary battery according to an embodiment, and FIG. 2A illustrates a perspective view of a can according to the embodiment. FIG. 2B illustrates a sectional view taken along 'I-I' line of FIG. 2A, and FIG. 2C illustrates a plan view of the can according to an embodiment. FIG. 2D illustrates a plan view of the shape of the can of an embodiment deformed by vertical compression.

Referring to FIGS. 1 and 2A to 2D, a secondary battery 100 according to an embodiment may include an electrode assembly 110, a can 120 and a cap assembly 130. The secondary battery may be a lithium secondary battery. Two facing wide walls 121 of the can 120 may be formed to be asymmetrical to each other. Accordingly, the secondary battery 100 may have directionality of deformation when the secondary battery 100 is vertically compressed. In other words, the secondary battery 100 may improve safety by controlling a short between electrode plates by using a can whose wide walls 121 are asymmetrical to each other and thus may constantly reproduce a deformation shape when the battery is vertically compressed.

The electrode assembly 110 may include cathode and anode plates 111 and 112 and a separator 113 interposed between the plates 111 and 112. In addition, the electrode assembly 110 may further include cathode and anode tabs 114 and 115 having ends that may be fixed and project from an upper part of the electrode assembly 110. Thus, the cathode tab 114 may protrude from the cathode plate 111 and the anode tab 115 may protrude from the anode plate 112. The cathode and anode tabs 114 and 115 may include, e.g., aluminum (Al), nickel (Ni) or copper (Cu). Generally, the cathode tab 114 may be made of aluminum (Al) and the anode tab 115 may be made of nickel (Ni). In addition, insulation tape 116 may be wound on the parts of the cathode and anode tabs 114 and 115 projected from the upper part of the electrode assembly 110 to prevent a short between the cathode and anode plates 111 and 112. To improve electrical capacity, the electrode assembly 110 may be formed by interposing the separator 113 between the cathode and anode plates 111 and 112 to insulate them from each other, and winding them together in a jelly-roll shape. Cathode and anode active materials may be respectively coated on the cathode and anode plates 111 and 112. The cathode active material may include, e.g., a highly stable lithium manganese compound, and the anode active material may include, e.g., a carbonic compound.

The can 120 may include wide and narrow walls 121 and 122 and a lower plate 123 sealing lower parts of the wide and narrow walls 121 and 122, thereby forming space to receive the electrode assembly 110. The facing wide walls 121 of the can 120 may be formed to be asymmetrical to each other. In addition, an opening may be formed at an upper part of the can 120 and the electrode assembly 110 may be inserted through the opening. The opening may be sealed by the cap assembly 130. In other words, in a rectangular secondary battery, the can 120 may be made of metal in a roughly cubic shape whose one end may be opened and may be made by, e.g., deep drawing. The can 120 may be made of a lightweight conductive metal, e.g., aluminum (Al) or aluminum alloy. Thus the can 120 may function as a terminal by itself.

In the can 120, the wide wall 121 may be defined as a side wall having a relatively long width or length of a horizontal edge. Pairs of wide walls 121 may be spaced to face each other, thereby forming front and rear surfaces of the can 120. In other words, the wide wall 121 may include first and second wide walls 121a and 121b. The wide walls may have thicknesses of about 0.18 mm to about 0.4 mm. Maintaining the thickness of the wide wall at about 0.18 mm or greater may help ensure that the wide wall has sufficient strength and is not easily deformed during the assembling process or a standard test, thus preventing damage to the electrode assembly 110 contained in the can. Maintaining the thickness of the wide wall at about 0.4 mm or less may help ensure that the size of the electrode assembly 110 is not reduced according to the thickness of the wide wall. Accordingly, capacity of the battery may be maintained. In addition, maintaining the thickness of the wide wall at about 0.4 mm or less may help ensure that the overall size of the battery is not increased; thus the structure of an external device using the battery need not be changed. In other words, in consideration of cost and/or ease of process, it may be desirable to form the wide wall 121 to have a thickness of about 0.4 mm or less to help ensure sufficient strength.

Thicknesses d1 and d2 of the first and second wide walls 121a and 121b may be different from each other. The thicknesses d1 and d2 of the first and second wide walls 121a and 121b may be about 0.18 mm to about 0.4 mm. The thickness difference $\Delta d_{1-2}$ between the first and second wide walls 121a and 121b may be about 0.05 mm to about 0.10 mm. Maintaining the thickness difference $\Delta d_{1-2}$ between the first and second wide walls 121a and 121b at about 0.05 mm or greater may help ensure that the thickness difference $\Delta d_{1-2}$ is not too small to reproduce directionality of deformation; thus, the deformation shape may remain constant when force (Fa) is applied from both sides about a vertical axis (z) by a vertical compression test or external impact. Maintaining the thickness difference $\Delta d_{1-2}$ between the first and second wide walls 121a and 121b at about 0.10 mm or less may help ensure that the force (Fa) applied in the vertical compression test or by external impact is not concentrated on a relatively thinner one of the first and second wide walls 121a and 121b, and thus the wide wall may not be easily and greatly deformed by weak force (Fa) or impact.

As described above, the thicknesses d1 and d2 of the first and second wide walls 121a and 121b may be different from each other. In other words, the can 120 may be formed asymmetrically according to the thickness difference $\Delta d_{1-2}$ between the first and second wide walls 121a and 121b. Accordingly, in the vertical compression test for the secondary battery 100 including the can 120, when the force (Fa) is applied to both sides of the battery about the vertical axis (z), the battery may be deformed as shown in FIG. 2D. Thus, a short between the electrode plates 111 and 112 may be controlled by securing reproducibility of the deformation. In addition, safety of the secondary battery 100 may be improved by controlling a short between the electrode plates 111 and 112.

A weak welding part 121c may be formed at the middle of an upper part of the wide wall 121. The weak welding part 121c may be welded weaker than peripheral parts thereof. The weak welding part 121c may be defined as a region that is welded weaker than a completely welded region when the entire contact region between the can 120 and cap assembly 130 is welded to seal the can 120 and an opening of the can. The weak welding part 121c may be formed by controlling operation conditions for, e.g., power and speed, etc., of a welding device. For example, when the can 120 and cap assembly are welded, welding strength may be determined according to a depth by which the contact surface between the can and cap assembly is melted. In other words, when the melting depth is deep, the welding strength may be larger than a region of shallow meting depth. The melting depth may be controlled by changing, e.g., power and speed, etc., of a welding device. The weak welding part 121c may be formed by weakly welding, thus, reducing power at the region for the weak welding part 121c by about 10 to about 30% compared to other regions as the welding device moves along the contact surface between the can 120 and cap assembly 130 to weld them to each other. Maintaining the decrease in power applied to the welding device at about 10% or greater may help ensure there is a difference between welding strengths of the weak welding part 121c and peripheral part. Maintaining the power decrease applied to the welding device at about 30% or less may help ensure that the can and cap assembly are sufficiently welded.

On the other hand, the weak welding part 121c may be formed by weakly welding, i.e., increasing the speed at the region for the weak welding part 121c by about 10% to about 30% compared to other regions. Maintaining the speed range as above may provide similar advantages to the above power control.

The weak welding part 121c may be configured to cause deformation of the can when the battery is vertically compressed and improves reproducibility of deformation by providing directionality to the deformation. The weak welding part 121c may be formed at the relatively thin portions of the first or second wide wall 121a or 121b, i.e., at the middle of the upper part of the first or second wide wall 121a or 121b.

The narrow wall 122 may be defined as a side wall having a relatively short width or length of a horizontal edge. The narrow wall 122 may be connected to a side edge of the wide wall 121. Pairs of narrow walls 122 may be spaced to face each other, thereby forming both side surfaces of the can 120. In other words, the narrow wall may include first and second narrow walls 122a and 122b that respectively correspond to both side surfaces of the can. The narrow wall may have a rounded shape. A thickness of the narrow wall 122 may gradually decrease from one side thereof toward the other side. For example, when the first wide wall 121a is thicker than the second wide wall 121b, a thickness d3 of a region of the narrow wall 122 adjacent to the first wide wall 121a may be larger than a thickness d4 of a region of the narrow wall 122 adjacent to the second wide wall 121b. In other words, when the first and second wide walls 121a and 121b are formed to be asymmetrical to each other according to the thickness difference $\Delta d_{1-2}$, the thickness of the narrow wall 122 between the first and second wide walls may be different in regions according to the thicknesses of the wide walls, because the can 120 may be integrally formed through deep drawing. It may be desirable that the first and second narrow walls 122a and 122b having different thicknesses are formed to be symmetrical to each other about the vertical axis (z).

The lower plate 123 may correspond to the upper opening of the can 120 and may be sealed. In addition, the lower plate 123 may be connected to the lower parts of the wide and narrow walls 121 and 122. The lower plate 123 may support structures or contents of the battery and thus may be formed thicker than the wide walls 121 or narrow walls 122. The lower plate may have a thickness of about 0.2 mm to about 0.7 mm.

The cap assembly 130 may be provided at the upper part of the can 120 and may be finished by welding. The region on the circumference of the cap assembly corresponding to the weak welding part 121c may be insufficiently welded. The cap assembly 130 may include a cap plate 131, a gasket 132, an electrode terminal 133, an insulation plate 134, a terminal plate 135, an insulation case 136 and a stopper 137.

The cap plate 131 may include a terminal hole 131a and an electrolyte injection hole 131b. The electrode terminal 133 may be inserted through the terminal hole 131a. The electrode terminal 133 may be assembled with the gasket 132 including, e.g., insulating material at a side wall thereof, and then inserted into the terminal hole 131a to insulate the metallic cap plate 131 and electrode terminal 133 from each other. The electrolyte injection hole 131b may be provided at one side of the cap plate 131 to inject electrolyte into the can 120. After the electrolyte is injected through the electrolyte injection hole 131b, the electrolyte injection hole 131b may be sealed with the stopper 137 to prevent leakage of the electrolyte.

The insulation plate 134 may be provided under the cap plate 131. The terminal plate 135 may be provided under the insulation plate 134. Thus, the insulation plate 134 may insulate the cap plate 131 from the terminal plate 135. The terminal plate 135 may be connected to a lower end of the electrode terminal 133. Accordingly, the anode plate 112 of the electrode assembly 110 may be electrically coupled to the electrode terminal 133 through the anode tab 115 and terminal plate 135. The cathode plate 111 of the electrode assembly 110 may be electrically coupled to the cap plate 131 or can 120 through the cathode tab 114.

The insulation case 136 may be provided under the terminal plate 135. The insulation case 136 may include an anode tab penetration part 136a, a cathode tab penetration part 136b and an electrolyte injection hole 136c.

The stopper 137 may be seal the electrolyte injection hole 131b after the electrolyte is injected into the electrolyte injection hole 131b. In addition to the stopper 137, the electrolyte injection hole 131b may be sealed by pressing, e.g., a ball therein.

As described above, the secondary battery 100 may include the can whose wide walls 121 are asymmetrical according to the thickness difference $\Delta d_{1-2}$. Thus, the secondary battery 100 may be deformed with a certain directionality when a force (Fa) is applied to both narrow walls 122a and 122b by, e.g., external impact or a vertical compression test. In addition, the secondary battery 100 may have reproducibility of deformation and thus may control a short between the electrode plates 111 and 112 during impact. Thus, safety of the secondary battery 100 may thereby be improved.

Figure 3:
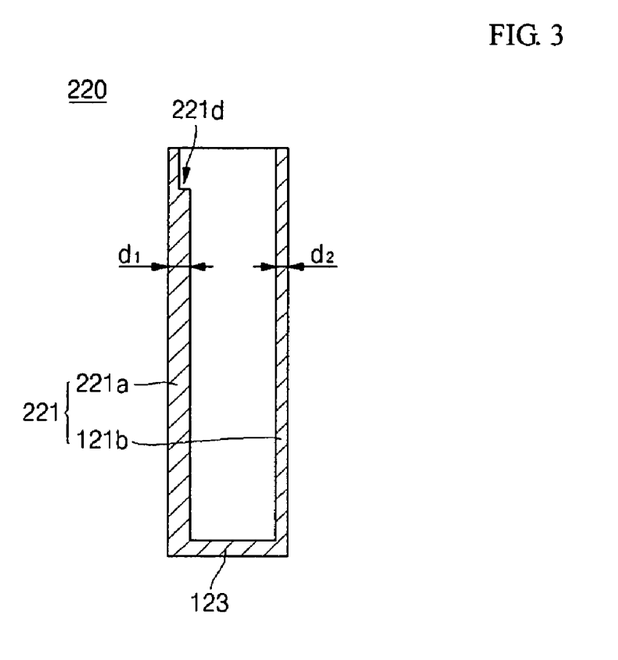
FIG. 3 illustrates a vertical sectional view of a can according to another embodiment.

A secondary battery according to a another embodiment will be explained below. FIG. 3 illustrates a vertical sectional view of a can according to the embodiment.

The secondary battery of another embodiment may have the same elements as the secondary battery of the embodiment described above except that a stepped part may be formed in a wide wall. Accordingly, the same drawing reference numerals are used for the same elements, and repeated explanation of them will be omitted. Thus, the stepped part difference from the above embodiment will be mainly explained below.

The secondary battery of this embodiment may include an electrode assembly 110, a can 220 and a cap assembly 130. The can 220 may be formed asymmetrically because of a stepped part 221d formed at any one of two facing wide walls 221 thereof. The can 220 may include the same material and may be formed by the same process as the can 120 of the above embodiment, and may perform the same function.

Referring to FIG. 3, the can 220 may include a wide wall 221, a narrow wall 122 (not shown) and a lower plate 123 sealing lower parts of the wide and narrow walls 221 and 122, thereby forming space to receive the electrode assembly 110. The facing wide walls 221 of the can 220 may be asymmetrical to each other.

The wide wall 221 may include first and second wide walls 221a and 121b that respectively correspond to front and rear surfaces of the can. A weak welding part 121c (not shown) may be formed at the middle of an upper part of the second wide wall 121b. The weak welding part 121c may be welded weaker than peripheral part thereof. In addition, the wide wall 221 may include a stepped part 221d. The cap assembly 130 may be seated on the stepped part 221d. Accordingly, it may be desirable that a height of the stepped part 221d corresponds to a thickness of the cap assembly 130. The stepped part 221d may be formed inside the upper part of the relatively thicker wide wall 221 of the first and second wide walls 221a and 121b. Thus, the stepped part 221d may more stably support the cap assembly 130. In addition, the stepped part 221d may enhance a combining strength between the cap assembly 130 and can 220, thereby allowing the can to be deformed toward the second wide wall 121b which faces the first wide wall 221a, and which is provided with the stepped part 221d— when the battery is vertically compressed. In other words, the stepped part 221d may provide directionality of deformation when the battery is vertically compressed. The first wide wall 221a may be relatively thicker, and the stepped part 221d may be formed inside the upper part of first wide wall 221a as illustrated in FIG. 3. However, the second wide wall 121 b may be relatively thicker, and the stepped part 221d may be formed inside the upper part of second wide wall 121b. The secondary battery of the embodiment may improve directionality and reproducibility of deformation when the battery is vertically compressed due to the inclusion of the stepped part 221d formed at the relatively thicker wide wall 221.

Figure 4:
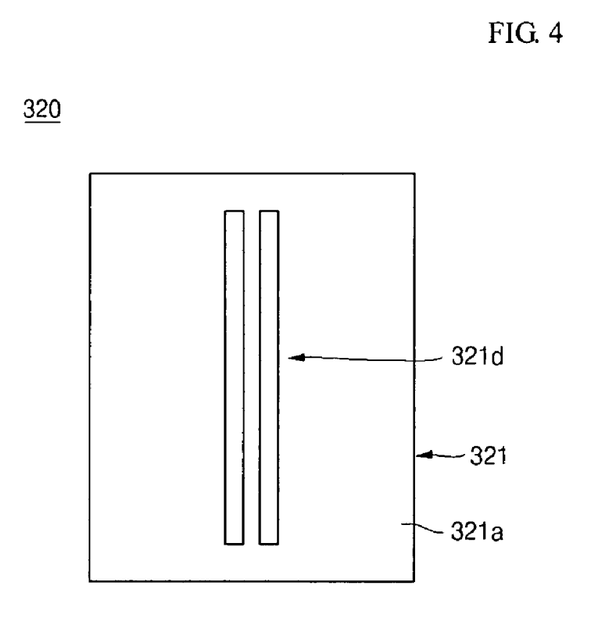
FIG. 4 illustrates a side view of a wide wall of a can according to yet another embodiment.

A secondary battery according to yet another embodiment will be explained below. FIG. 4 illustrates a side view of a wide wall of a can according to the embodiment.

The secondary battery of the embodiment may have the same elements as the secondary battery of the above embodiment except for the structure of a wide wall. Accordingly, the same drawing reference numerals are used for the same elements, and a repeated explanation of them will be omitted. Thus, the difference in structure of the wide wall from that of the above embodiment will be explained below.

The secondary battery of the embodiment may include an electrode assembly 110, a can 320 and a cap assembly 130. The can 320 may be formed asymmetrically because of a patterned part 321d formed on any one of two facing wide walls 321 having the same thickness. The can 320 may include the same material and may be formed by the same process as the can 120 of the above embodiment, and may perform the same function.

Referring to FIG. 4, the can 320 may include a wide wall 321, a narrow wall 122 and a lower plate 123 sealing lower parts of the wide and narrow walls 321 and 122, thereby forming space to receive the electrode assembly 110. The facing wide walls 321 of the can 320 may be asymmetrical to each other. The thickness of the walls of the can 320 may be about 0.18 mm to about 0.4 mm.

The wide wall 321 may include first and second wide walls 321a and 121b that respectively correspond to front and rear surfaces of the can. In addition, the wide wall 321 may include the patterned part 321d. The patterned part 321d may be formed in the direction of vertical axis on any one of the first and second wide walls 321a and 121b. The patterned part 321d may be formed as a groove type linear bar, and may be thinner than peripheral parts of the wide wall 321. Thus, the patterned part 321d may guide the secondary battery to be bent according to the shape of the patterned part 321d when the battery is vertically compressed. In addition, the patterned part 321d may provide directionality of deformation of the secondary battery, e.g., only in the direction of vertical axis. It may be desirable that a horizontal width of the patterned part 321d is not more than about 10% of a width of the wide wall 321. Maintaining the horizontal width of the patterned part 321d at about 10% of the width of the wide wall 321 or less helps ensure that the wide wall 321 is not easily deformed nor is strength of the wide wall 321 weakened. The lower limit of the width of the patterned part 321d may not be restricted because a patterned part 321d having a very narrow width may provide the same effect as a patterned part 321d having an upper limit width. The patterned part 321d may be formed on the first wide wall 321a as illustrated in FIG. 4. However, the patterned part 321d may be formed at the second wide wall 121b having the same thickness as the first wide wall. The secondary battery of the embodiment may improve directionality and reproducibility of deformation when the battery is vertically compressed by including the patterned part 321d formed in the direction of a vertical axis at the middle of the wide wall 321.

Figure 5:
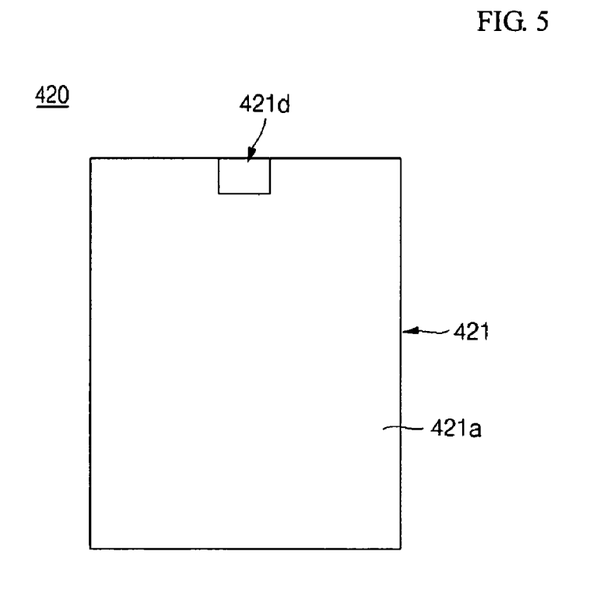
FIG. 5 illustrates a side view of a wide wall of a can according to yet another embodiment.

A secondary battery according to yet another embodiment will be explained below. FIG. 5 illustrates a side view of a wide wall of a can according to the embodiment.

The secondary battery of the embodiment has the same elements as the secondary battery of the above embodiment except for the location and shape of a patterned part. Accordingly, the same drawing reference numerals are used for the same elements and explanation of them will be omitted. Thus, the structure of the wide wall that is different from the above embodiment will be mainly explained below.

The secondary battery of the embodiment may include an electrode assembly 110, a can 420 and a cap assembly 130. The can 420 may be formed asymmetrically due to a patterned part 421d formed on any one of two facing wide walls 421 having the same thickness. The can 420 may include the same material and may be formed by the same process as the can 320 of the above embodiment, and may perform the same function.

Referring to FIG. 5, the can 420 may include a wide wall 421, a narrow wall 122 and a lower plate 123 sealing lower parts of the wide and narrow walls 421 and 122, thereby forming space to receive the electrode assembly 110. The facing wide walls 421 of the can 420 may be asymmetrical to each other. The thickness of the walls of the can 420 may be about 0.18 mm to about 0.4 mm.

The wide wall 421 may include first and second wide walls 421a and 121b that respectively correspond to front and rear surfaces of the can. In addition, the wide wall 421 may include the patterned part 421d. The patterned part 421d may be formed at the middle of an upper part of any one of the first and second wide walls 421a and 121b. The patterned part 421d may be formed as, e.g., a circle, a triangle or a rectangle, and may be thinner than peripheral parts of the wide wall 421. Thus, the patterned part 421d may function as a deformation point where deformation of the secondary battery may be started. In addition, the patterned part 421d may provide directionality to the deformation of the secondary battery toward the first wide wall 421a having the patterned part 421d. A horizontal width of the patterned part 421d may be about 10% of a width of the wide wall 421 or less. The patterned part 421d may be formed at the first wide wall 421a as illustrated in FIG. 5. However, the patterned part 421d may be formed at the second wide wall 121b having the same thickness as the first wide wall. The secondary battery of the embodiment may improve directionality and reproducibility of deformation when the battery is vertically compressed by including the patterned part 421d at the middle of the upper part of the wide wall 421.

Figure 6:
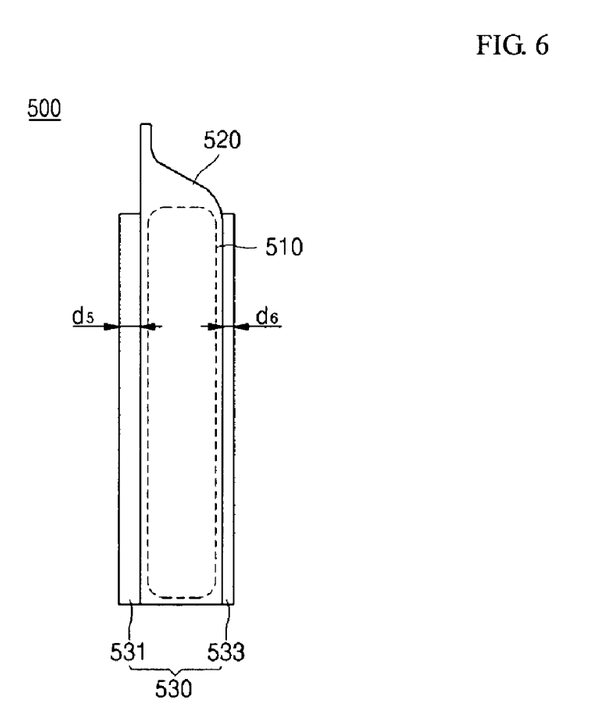
FIG. 6 illustrates a side view of a secondary battery according to still another embodiment.

A secondary battery according to still another embodiment will be explained below. FIG. 6 illustrates a side view of a secondary battery according to the embodiment.

The secondary battery 500 may be a lithium polymer battery. Referring to FIG. 6, the secondary battery 500 may include an electrode assembly 510, a pouch outer case 520 and a reinforcing plate 530. The reinforcing plates 530 may be asymmetrically provided at both sides of the pouch outer case 520.

The electrode assembly 510 may be formed by stacking a cathode plate, a separator and an anode plate in that order, and winding them together in a jelly-roll shape. The electrode assembly 510 may also be formed by laminating a plurality of cathode plates, separators and anode plates in a stack shape. In addition, cathode and anode tabs may respectively protrude out of the cathode and anode plates. The protruding parts may project out through a sealing surface of the pouch outer case 520, and the projected cathode and anode tabs may be connected to a terminal of a protection circuit module.

The pouch outer case 520 may be a composite film including, e.g., a thin metal layer and inner and outer layers provided on both surfaces of the metal layer. The pouch outer case 520 may be freely deformed because of its formability and flexibility. The pouch outer case 520 may be manufactured by arranging the composite film having the above construction in a mold, forming a groove to receive the electrode assembly 510 by pressing the film with a predetermined pressure and trimming the film along a periphery thereof to a desired shape. The pouch outer case 520 may have a roughly rectangular shape to optimize space utilization for receiving the electrode assembly 510.

The reinforcing plate 530 may be formed to keep the shape of the pouch outer case 520 flexible and to reinforce strength. The reinforcing plate 530 may be formed of, e.g., metal or plastic. The reinforcing plates 530 may be formed on the front and rear surfaces of the pouch outer case 520. In addition, the reinforcing plates 530 may have sizes corresponding to areas of the front and rear surfaces. In other words, the reinforcing plates 530 may include a first reinforcing plate 531 formed on the front surface of the pouch outer case 520 and a second reinforcing plate 533 formed on the rear surface of the pouch outer case 520. Thicknesses d5 and d6 of the first and second reinforcing plates 531 and 533 may be different from each other. In other words, the reinforcing plate 530 may perform the same function as the wide walls 121 that are formed asymmetrically to each other in the above embodiment.

As described above, the secondary battery 500 may include the reinforcing plates 530 that are asymmetrical to each other because of the thickness difference between them, and thus the secondary battery 500 may be deformed with a certain directionality when the battery is vertically compressed or impact is applied to both sides thereof. In addition, the secondary battery 500 may reproducibly deform to a predetermined shape and thus may control a short between the electrode plates during, e.g., a vertical compression test or external impact. Thus, safety of the secondary battery may be improved.

As described above, the secondary battery according to an embodiment may produce the following effects. When the battery is vertically compressed, the battery may be unidirectionally deformed via the can whose front and rear surfaces may be asymmetrical to each other about the direction of a long edge. The deformation shape caused by the vertical compression may be consistently reproduced. A short between the electrode plates may thereby be controlled. Therefore, safety of the secondary battery may be improved.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery, comprising:
an electrode assembly;
a can having an upper opening to receive the electrode assembly and two facing wide walls, the wide walls being asymmetrical to each other; and
a cap assembly sealing the upper opening of the can,
wherein the wide walls include a first wide wall and a second wide wall welded with the cap assembly, the second wide wall having an upper part, the upper part including a weak welding part at a middle part thereof and the weak welding part having a weld between the second wide wall and the cap assembly that is weaker than a weld between remaining portions of the upper part of the second wide wall and the cap assembly.

2. The secondary battery as claimed in claim 1, wherein the second wide wall is thinner than the first wide wall.

3. The secondary battery as claimed in claim 2, wherein thicknesses of the first wide wall and the second wide wall are each about 0.18 mm to about 0.4 mm.

4. The secondary battery as claimed in claim 3, wherein a thickness difference between the first wide wall and the second wide wall is about 0.05 mm to about 0.10 mm.

5. The secondary battery as claimed in claim 2, wherein the can includes a narrow wall connected to the first wide wall and the second wide wall and the narrow wall has a rounded shape.

6. The secondary battery as claimed in claim 5, wherein the narrow wall has a thickness and the thickness gradually decreases from the first wide wall toward the second wide wall.

7. The secondary battery as claimed in claim 6, wherein the narrow wall includes a first and a second narrow wall and the first and second narrow walls are symmetrical to each other.

8. The secondary battery as claimed in claim 2, wherein the upper part includes a stepped part therein.

* * * * *